United States Patent [19]

Knapp

[11] 4,256,497
[45] Mar. 17, 1981

[54] LEAD-FREE GLAZE FOR ALUMINA BODIES

[75] Inventor: Randy O. Knapp, Cottam, Canada

[73] Assignee: Champion Spark Plug Company, Toledo, Ohio

[21] Appl. No.: 119,938

[22] Filed: Feb. 8, 1980

[51] Int. Cl.³ .................. C03C 5/02; C04B 33/26
[52] U.S. Cl. .......................... 106/48; 106/46; 106/54; 106/73.4
[58] Field of Search ............... 106/48, 54, 73.4, 46

[56] References Cited
U.S. PATENT DOCUMENTS 3,929,496  12/1975  Asano et al. ................... 106/46
4,084,976  4/1978   Hinton ......................... 106/48
4,120,733  10/1978  Knapp .......................... 106/48

*Primary Examiner*—Helen M. McCarthy
*Attorney, Agent, or Firm*—John C. Purdue

[57] ABSTRACT

A high-silica ceramic glaze, having a low coefficient of thermal expansion, suitable for application to alumina bodies, is disclosed. The glaze consists essentially, by weight percent, of 35 to 54 percent $SiO_2$, from 7 to 11 percent $Al_2O_3$, from 17 to 25 percent $B_2O_3$, from 2 to 3 percent CaO, from 2 to 2½ percent ZnO, from 4¼ to 5 percent $Na_2O$, from 8½ to 21 percent SrO, and from 0.7 to 1 percent of a mixture of $K_2O$, $Li_2O$ and MgO, and minor impurities.

6 Claims, No Drawings

LEAD-FREE GLAZE FOR ALUMINA BODIES

BACKGROUND OF THE INVENTION

Glazes are continuous coatings which are usually prepared from fused silicate mixtures and are fusion-bonded to ceramic substrates. A glaze is used on a ceramic substrate to serve one or more of the following purposes: (1) to render the substrate impermeable to liquids and gases, (2) for aesthetic reasons, including covering blemishes and providing decorative effects, (3) to provide protective coatings, and (4) to increase strength.

The exterior portion of a spark plug insulator is exposed to dirt and grease which may result in the formation of the electrically conducting surface and premature failure of the spark plug. Alumina insulator bodies of spark plugs are usually coated with a ceramic glaze in order to minimize dirt and grease build-up, and to increase the strength and imperviousness of the surface. Depending on the particular properties desired, the glaze can be modified to change the maturing temperature, to add color, or to modify the coefficient of thermal expansion.

Glazes applied to alumina substrates must have a low coefficient of thermal expansion, similar to that of the alumina substrate, to avoid undue stresses which can cause spalling, chipping, cracking, or crazing of the glaze. A typical range of coefficients of thermal expansion for alumina bodies is from 6 to 7 micro inches per inch per °C. A glaze with a low coefficient of thermal expansion also strengthens the insulator by inducing compressive stresses at the surface of the glaze-insulator composite. Because glazes involve highly complex multi-component systems, it is difficult to predict the effect of varying or substituting chemical compounds in a glaze formulation, even though general properties of some of the individual components are known. Furthermore, because a glaze is not homogeneous, that is, it may contain at least one dispersed, undissolved phase, the properties of a glazed article as a whole are not easily predictable on the basis of the ultimate chemical composition of the glaze.

Because its oxides and carbonates enter easily into combination with silica and boric acid, lead finds extensive use in glazes. The addition of lead to a glaze lowers the coefficient of thermal expansion and lowers the modulus of elasticity; lead also decreases melt viscosity, reduces the danger of devitrification, broadens the maturing range, and lowers the surface tension of molten glazes, helping to homogenize the glaze and form a defect-free surface.

However, the use of lead compounds in glazes has numerous disadvantages, for example, it decreases the abrasion resistance of the glaze, and increases volatility when the firing is above cone 6 or 7.

A more serious problem is the toxic nature of the lead compounds used in glazes. Occupational exposure to lead compounds may provide an opportunity for ingestion and subsequent lead extraction by digestive acids. The danger of lead poisoning is amplified because lead tends to accumulate in the central nervous system of the human body. Increased concern and knowledge relating to environmental health and safety have made it increasingly desirable to substitute a lead-free glaze for lead-containing glazes presently in use. In order to be suitable, lead-free glazes must be non-toxic and contain ingredients which are readily available at a reasonable cost. Transparent glazes, over underglaze decorations, are usually preferred.

Lead-free glazes suitable for application to high-alumina ceramics have been developed, and are disclosed and claimed in U.S. Pat. Nos. 4,084,976 and 4,120,733. The former patent discloses a glaze which consists essentially of from 50 to 54 percent* $SiO_2$, from 5 to 8 percent $Al_2O_3$, from 6 to 12 percent $B_2O_3$, from 4 to 6 percent CaO, from 2 to 15 percent BaO, from 5 to 8 percent SrO, from 1 to 2 percent ZnO, from 2 to 8 percent MgO, and from 4 to 6 percent total of a mixture of $Na_2O$, $K_2O$, and $Li_2O$, and minor impurities. The latter patent discloses a glaze which consists essentially of from 48 to 54 percent $SiO_2$, from 7 to 11 percent $Al_2O$, from $16\frac{1}{2}$ to 20 percent $B_2O_3$, from 11 to 14 percent BaO, from 2 to 3 percent CaO, from 2 to $2\frac{1}{2}$ percent ZnO, from $4\frac{1}{4}$ to $5\frac{1}{4}$ percent $Na_2O$, and from 0.4 to 1 percent $K_2O$. Ingredients which can be tolerated include $Li_2O$, SrO and MgO to the extent of up to about $\frac{1}{4}$ percent, $\frac{1}{2}$ percent and 1 percent, respectively, and minor amounts of other purities.

*The terms "percent" and "parts" are used herein and in the appended claims to refer to percent and parts by weight, unless otherwise indicated.

SUMMARY OF THE INVENTION

This invention relates to lead-free glazes useful for application to alumina substrates. The glaze consists essentially of 35 to 54 weight percent $SiO_2$, from 7 to 11 percent $Al_2O_3$, from 17 to 25 percent $B_2O_3$, from 2 to 3 percent CaO, from 2 to $2\frac{1}{2}$ percent ZnO, from $4\frac{1}{4}$ to 5 percent $Na_2O$, from $8\frac{1}{2}$ to 21 percent SrO, and from 0.7 to 1 percent of a mixture of $K_2O$, $Li_2O$, and MgO. Minor amounts of impurities, e.g., $Fe_2O_3$, and $TiO_2$ or a mixture are sometimes present as unnecessary, but harmless ingredients. The lead-free glaze of the present invention differs in chemical composition from the glazes of U.S. Pat. Nos. 4,084,976 and 4,120,733 in that the BaO component of those glazes is eliminated, and the percent of SrO is substantially increased over that in the prior applications. As a consequence of this difference in composition and corresponding alterations of the amounts of other components of the glaze composition, this Strontia-for-Baria substitution in the glaze of the subject invention is an improvement over both of the above patented glazes, providing several specific advantages. These include lowered toxicity of the SrO-containing glaze as compared with a lead-free glaze containing BaO, thereby further reducing the risk of occupational exposure, lower cost of SrO as compared with BaO, and greater availiability of SrO and strontium-bearing minerals when compared to that of baria.

OBJECTS OF THE INVENTION

It is an object of the invention to provide lead-free glazes.

It is a further object of the invention to provide lead-free glazes having a coefficient of thermal expansion similar to that of high-alumina substrates.

It is also an object of the invention to provide lead-free glazes which do not contain baria and which have a coefficient of thermal expansion similar to that of high alumina substrates.

Other objects and advantages of this invention will be apparent from the following disclosure.

DESCRIPTION OF PREFERRED EMBODIMENTS

EXAMPLE I

The following examples, which are presented solely for the purpose of further illustrating and disclosing the invention constitute preferred embodiments, Example I being the best presently known mode.

A fired alumina ceramic containing about 90 percent $Al_2O_3$, 7.2 percent $SiO_2$, 1.5 percent CaO, and 0.7 percent MgO, was coated with a lead-free glaze slurry, about 35 percent solids having the following composition*:

*Formulae reported herein, and in the appended claims, represent fired compositions, disregarding volatilization if any, of oxide ingredients during firing.

| Oxide | Percent |
|---|---|
| $SiO_2$ | 52.4 |
| $Al_2O_3$ | 8.9 |
| $B_2O_3$ | 19.3 |
| CaO | 2.3 |
| $Na_2O$ | 4.7 |
| $K_2O$ | 0.5 |
| $Li_2O$ | 0.2 |
| ZnO | 2.1 |
| SrO | 9.6 |

The coated alumina ceramic was then fired to 2050° F. to form a smooth, uniform glaze of high gloss and good strength. In other cases the firing has been at temperatures ranging from 1800° to 2200° F. There was not evidence in any case of crazing or devitrification in the glaze. The average strength increase attributable to the fired glaze was about 40 to 45 percent.

EXAMPLES II-XI

The above procedure was repeated with similar results for glazes of the following compositions:

tral" (amphoteric), or acid. The glaze oxides which are classified as bases, that is, the alkali metal and alkaline earth oxides, are designated as "$R_2O$" and "RO" respectively. The "neutral" or amphoteric oxides are designated as "$R_2O_3$" and acid oxides are designated as $RO_2$.

On an empirical molecular formula basis, the glaze composition set forth in Example I is shown in the table below:

CHEMICAL ANALYSIS

| Oxide | Symbol | Weight* percent | Molecular Weight | MOLES (Wt./Molecular weight) | "Normalized Mole Fraction" |
|---|---|---|---|---|---|
| $SiO_2$ | $RO_2$ | 52.39 | 60.1 | 0.872 | 3.54 |
| $Al_2O_3$ | $R_2O_3$ | 8.84 | 102.0 | 0.087 | 0.35 |
| $B_2O_3$ | $R_2O_3$ | 19.32 | 69.6 | 0.278 | 1.13 |
| CaO | RO | 2.32 | 56.1 | 0.041 | 0.17 |
| SrO | RO | 9.63 | 103.6 | 0.093 | 0.38 |
| ZnO | RO | 2.02 | 81.4 | 0.025 | 0.10 |
| $Na_2O$ | $R_2O$ | 4.68 | 62.0 | 0.075 | 0.30 |
| $K_2O$ | $R_2O$ | 0.48 | 94.2 | 0.005 | 0.02 |
| $Li_2O$ | $R_2O$ | 0.20 | 29.9 | 0.007 | 0.03 |

*Weight percentages are reported to two places after the decimal for completeness, and not as an indication of criticality.

In establishing the empirical formula for a glaze, the formula is "normalized" so that the sum of $R_2O$ and RO is brought to unity. In Example I, the sum of RO plus $R_2O$ equals 0.246 mole; dividing each of the "MOLES" obtained by the total moles of RO and $R_2O$ establishes the empirical formula for the glaze, given in the last column as "normalized mole fraction". By means of the empirical formula, the calculation of "batch weights" or the determination of the proportions of ingredients required to produce a glaze having a given formula is simplified, especially if it is desired to formulate the glaze from compounds other than oxides, such as for example, carbonates. Comparison of glaze formulations

| | WEIGHT PERCENT | | | | | | | | | |
|---|---|---|---|---|---|---|---|---|---|---|
| Oxide | II | III | IV | V | VI | VII | VIII | IX | X | XI |
| $SiO_2$ | 46.8 | 41.1 | 43.9 | 41.1 | 35.5 | 52.3 | 52.2 | 50.3 | 50.7 | 53.5 |
| $Al_2O_3$ | 8.9 | 8.9 | 8.9 | 8.9 | 8.9 | 7.4 | 7.4 | 8.9 | 9.1 | 11.2 |
| $B_2O_3$ | 19.3 | 19.3 | 22.1 | 25.0 | 25.0 | 20.0 | 20.2 | 20.9 | 20.2 | 17.3 |
| CaO | 2.3 | 2.3 | 2.3 | 2.3 | 2.3 | 2.4 | 2.4 | 3.0 | 3.1 | 2.2 |
| $Na_2O$ | 4.7 | 4.7 | 4.7 | 4.7 | 4.7 | 4.9 | 4.9 | 4.8 | 4.8 | 4.2 |
| $K_2O$ | 0.5 | 0.5 | 0.5 | 0.5 | 0.5 | 0.5 | 0.5 | 0.5 | 0.5 | 0.4 |
| $Li_2O$ | 0.2 | 0.2 | 0.2 | 0.2 | 0.2 | 0.2 | 0.2 | 0.2 | 0.2 | 0.2 |
| ZnO | 2.0 | 2.0 | 2.0 | 2.0 | 2.0 | 2.1 | 2.2 | 2.1 | 2.1 | 2.1 |
| SrO | 15.3 | 21.0 | 15.3 | 15.3 | 20.9 | 10.0 | 10.0 | 9.1 | 9.1 | 8.6 |
| MgO | — | — | — | — | — | 0.3 | — | 0.2 | 0.2 | 0.3 |

As previously stated, the ultimate composition of a glaze is highly complex. The compositions described above contain nine or more oxides. Even though it is not possible to predict quantitively the behavior of a glaze, it is desirable that some degree of comprehension and control be achieved.

The raw materials of glazes are almost always oxides or compounds that can be expressed as oxides, thus enabling the components to be described in terms of phase compositions having known characteristics. Because of this, glaze ceramists commonly use a system of expressing oxide compositions in terms of molar proportions, i.e., molecular equivalents. By means of molecular equivalents, an empirical oxide formula can be calculated for each glaze composition.

For purposes of arriving at an empirical molecular formula, all oxides are classified as either basic, "neuis thereby greatly simplified.

In general, the oxides which are present in the instant invention possess the following properties. The $SiO_2$ is macroscopically miscible at all temperatures. Control of the amount of silica is important, since if the silica is too high, the glaze becomes excessively refractory; if the silica is too low, the glaze becomes too soluble and, therefore, unstable. The amount and character of the other elements present greatly modifiy the effect of the silica present. The alumina increases the viscosity and retards macrocrystalline growth. High viscosity is undesirable in a glaze because it prevents healing of pinholes, scratches, and other minor surface flaws. The alkalies are strong fluxes and increase the fluidity of the molten glaze. Increasing the amount of alkali compounds present in the glaze increases the coefficient of thermal expansion, and has a direct bearing upon crazing of the glaze. The alkaline earths also act as vigorous fluxes in a glaze composition. For example, CaO acts as a flux at temperatures of cone 4 and above; excess calcia can cause loss of refractoriness and devitrification, leading to a low-gloss matte texture, possibly as the result of formation of anorthite ($CaO \cdot SiO_2$). Magnesia acts as a vigorous flux at higher temperatures, and lowers the coefficient of thermal expansion to a much greater degree than other bases. The oxides of strontium and zinc also act as fluxes.

The above Examples and experimental test results on a series of lead-free glazes indicate that the normalized molecular formula should contain from about 0.24 to 0.35 mole of $R_2O$, from about 0.07 to 0.11 mole of ZnO, and from 1.00 to 1.54 moles of $R_2O_3$, and that from 0.78 to 1.19 mole of the $R_2O_3$ should be $B_2O_3$. The results also indicate that the relationship of the remaining moles of RO (0.65 to 0.75 mole of MgO, CaO, and SrO) is critical, and of these moles of RO, from 0.33 to 0.57 mole should be SrO. Substantial variation of the ratio can cause devitrification and crazing of the glaze.

What I claim is:

1. A lead-free and barium-free ceramic glaze for application to sintered high alumina substrates and maturing at temperatures from 1800° to 2200° F. consisting essentially of from 35 to 54 percent $SiO_2$, from 7 to 11 percent $Al_2O_3$, from 17 to 25 percent $B_2O_3$, from 2 to 3 percent CaO, from 2 to 2½ percent ZnO, from 4¼ to 5 percent $Na_2O$, from 8½ to 21 percent SrO, and from 0.7 to 1 percent of a mixture of $K_2O$, $Li_2O$, and MgO.

2. A ceramic glaze as claimed in claim 1 consisting essentially of 52½ percent $SiO_2$, 9 percent $Al_2O_3$, 19¼ percent $B_2O_3$, 2¼ percent CaO, 4¾ percent $Na_2O$, ½ percent $K_2O$, ¼ percent $LiO_2$, 2 percent ZnO, and 9½ percent SrO.

3. A ceramic glaze as claimed in claim 1 wherein the normalized molecular formula contains from about 0.24 to 0.35 mole of $R_2O$, about 0.07 to 0.11 mole of ZnO and from 1.00 to 1.54 moles $R_2O_3$.

4. A ceramic glaze as claimed in claim 3 wherein from 0.78 mole to 1.19 moles of the $R_2O_3$ in the normalized molecular formula for the glaze is $B_2O_3$.

5. A ceramic glaze as claimed in claim 4 wherein the RO in the normalized molecular formula is from substantially 0.65 to 0.75 mole.

6. A ceramic glaze as claimed in claim 5 wherein SrO constitutes from 0.33 to 0.57 mole of the RO in the normalized molecular formula for the glaze.

* * * * *